US008239159B2

(12) United States Patent
Li et al.

(10) Patent No.: US 8,239,159 B2
(45) Date of Patent: Aug. 7, 2012

(54) METHOD USED TO YIELD IRRADIATION PRODUCT WITH MINIMAL IMPURITY FOR SOLID TARGET FOR GALLIUM (GA)-68/GERMANIUM (GE)-68 GENERATOR

(75) Inventors: Ming-Hsin Li, Taoyuan County (TW); Ting Shien Duh, Taoyuan County (TW); Wuu-Jyn Lin, Taoyuan County (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 400 days.

(21) Appl. No.: 12/569,908

(22) Filed: Sep. 30, 2009

(65) Prior Publication Data

US 2011/0077894 A1 Mar. 31, 2011

(51) Int. Cl.
*G06F 15/00* (2006.01)

(52) U.S. Cl. ........................ 702/127; 250/390.11; 423/2

(58) Field of Classification Search .................... 702/22, 702/30, 81, 84, 97, 127, 170; 250/384, 390.11; 423/2

See application file for complete search history.

(56) References Cited

U.S. PATENT DOCUMENTS 7,521,686 B2 * 4/2009 Stuenkel et al. ......... 250/390.11
2007/0207075 A1 * 9/2007 Fassbender ....................... 423/2

* cited by examiner

*Primary Examiner* — John H Le

(57) ABSTRACT

A method used to yield irradiation product with minimal impurity for the solid target for gallium (Ga)-68/germanium (Ge)-68 generator mainly consists of the procedures: first calculate the thickness d for the electroplated gallium (Ga)-69 on the solid target; and then through a graph of decay curves including 69Ga(p, 2n) 68Ge target thickness and incident energy with 5 different incident energy doses, derive the corresponding irradiation energy dose Yi for each group after decay; and through the graph including 69Ga(p,2n)68Ge incident energy and reaction cross-sectional area, derive the nuclear reaction cross-sectional area for each group for germanium(Ge)-68, gallium (Ga)-68, zinc (Zn)-65 and figure out the mean reaction area (MRA) from the reaction cross-sectional area of each group; and select the maximum germanium(Ge)-68 MRA value and the minimum gallium (Ga)-68 and zinc (Zn)-65 MRA values; and generate the required default irradiation energy for the MRA of each group.

8 Claims, 6 Drawing Sheets

METHOD USED TO YIELD IRRADIATION PRODUCT WITH MINIMAL IMPURITY FOR SOLID TARGET FOR GALLIUM (GA)-68/GERMANIUM (GE)-68 GENERATOR

BACKGROUND OF THE INVENTION

1. Field of the Invention

The invention is related an method used to yield irradiation products with minimal impurities for solid target for gallium (Ga)-68/germanium (Ge)-68 generator. Especially, it refers to a parameter assessment method with easy prediction and control and consistent quality in radiation products.

2. Description of the Prior Art

Traditional method used to yield irradiation products with minimal impurities for solid target for gallium (Ga)-68/germanium (Ge)-68 generator involves electroplating to stabilize gallium (Ga)-69 metal ions on solid target (solid target), irradiating the solid target with different doses of radiation energy (MeV) by trial-and-error, measuring the activity by radioactivity measuring instrument and accordingly calculating the yields. However, this method does not consider radiation energy dose and electroplating thickness of gallium (Ga)-69, so the overall prediction is not accurate and difficult to control.

Another method involves using inorganic acid (such as hydrochloric acid, HCl) to wash off radionuclide germanium (Ge)-68 from the target, measuring the activity by radioactivity measuring instrument and absorbing with organic and inorganic absorbents. This method does not consider other possible nuclear reactions than the primary nuclear reaction and the formation of many impurities when different doses of radiation (MeV) are used to irradiate the solid target. The impurities have similar half-life to the primary nuclides, so there will be a pseudo radiation dose. Therefore, when gallium (Ga)-68 metal ion decayed and washed from the generator is used for drug labeling, the metal ions in impurities will interfere with pretreatment efficiency and lower drug labeling yield.

In view of the drawbacks of traditional process parameter assessment method for the solid target for gallium (Ga)-68/germanium (Ge)-68 generator, the author has made improvement and come out with the present invention.

SUMMARY OF THE INVENTION

One objective of the present invention is to provide a process parameter assessment method for the solid target for gallium (Ga)-68/germanium (Ge)-68 generator. It is to figure out the process irradiation energy parameters by utilizing the fundamental principles of physics with respect to the function graph for 69Ga(p, 2n) 68Ge nuclear reaction incident energy and reaction cross-sectional area and the function graph for 69Ga(p, 2n) 68Ge target thickness and incident energy decay. As a result, the overall operation process is simple and the quality of germanium (Ge)-68 nuclide is stable and consistent.

Another objective of the present invention is to provide a process parameter assessment method for the solid target for gallium (Ga)-68/germanium (Ge)-68 generator. Thus, the content of the impurities to the irradiated germanium (Ge)-68 nuclide can be predicted and controlled by scientific means and the irradiation products are formed with the physical and chemical properties that they are supposed to have.

To attain the above objectives and functions, the adopted technical approach includes the following steps:

a. Calculate the thickness d for the electroplated gallium (Ga)-69 on the solid target;

b. On a graph of incident energy decay curves comprising a plural number of different irradiation energy doses Xi and 69Ga(p, 2n) 68Ge target thickness, select a decay curve with a default irradiation energy dose Xi, and based on the electroplating thickness d derive the relative irradiation energy dose Yi after decay;

c. On a graph of corrected function curves for 69Ga(p, 2n) 68Ge incident energy dose and reaction cross-sectional energy area with different germanium (Ge)-68, gallium (Ga)-68, zinc (Zn)-65 irradiation doses and cross-sectional area, based on the defined position by irradiation energy dose Xi and the corresponding irradiation energy dose Yi, derive the two nuclear reaction cross-sectional areas corresponding to germanium (Ge)-68 and figure out the mean reaction area (MRA); by the same means, derive the two nuclear reaction cross-sectional areas corresponding to gallium (Ga)-68 and zinc (Zn)-65, the two nuclear reaction cross-sectional areas corresponding to zinc (Zn)-65 and calculate the mean reaction area for each;

d. Repeat the above step b and step c and complete in sequence other different irradiation energy doses Xi, and derive a plural number of group s of MRAs corresponding to germanium (Ge)-68, gallium (Ga)-68 and zinc (Zn)-65;

e. Select the maximum MRA corresponding to germanium (Ge)-68 and the minimum MRA corresponding to gallium (Ga)-68 and zinc (Zn)-65, and generate the required default radiation dose for each reaction cross-sectional area in the group, which is the optimal reaction energy.

As for the detailed structure, application principles, functions and benefits, please refer to the attached figures and explanation for a complete understanding:

DETAILED DESCRIPTION OF THE INVENTION

Figure 1:
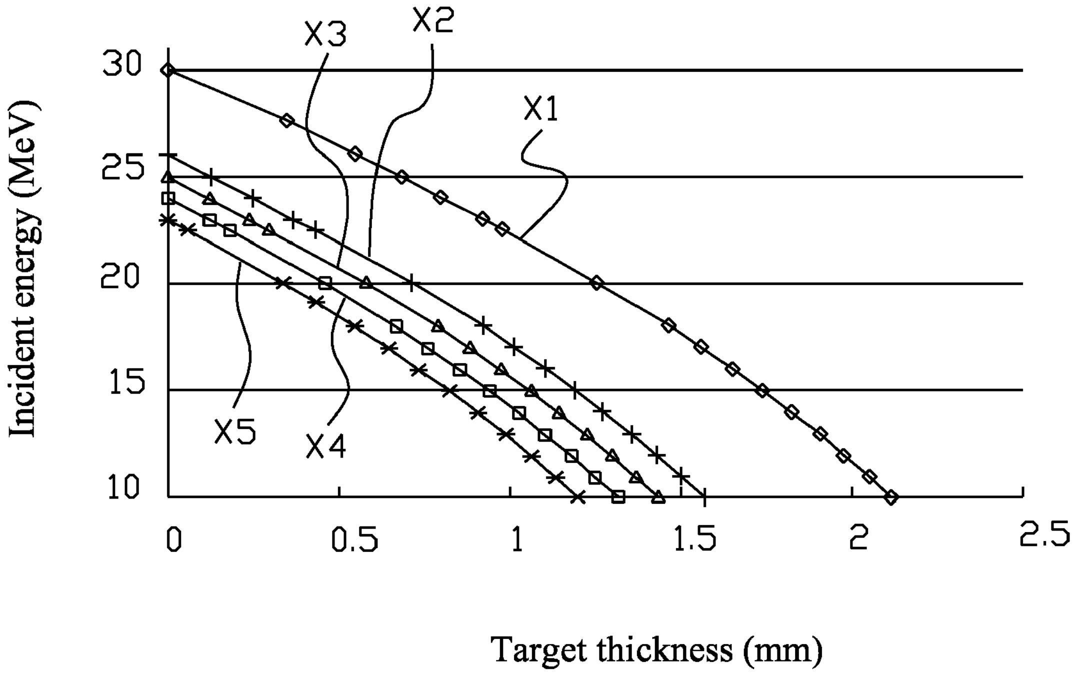
FIG. 1 is the function graph for 69Ga(p, 2n) 68Ge target thickness and incident energy decay.
Figure 2:
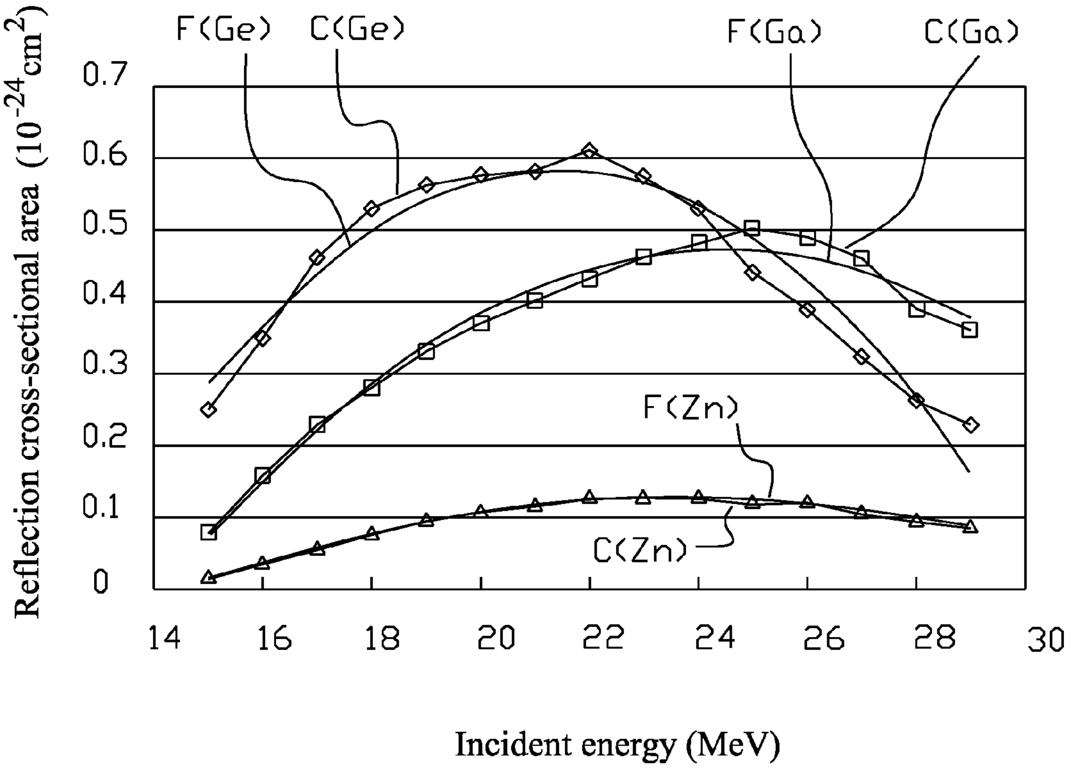
FIG. 2 is the function graph for 69Ga(p, 2n) 68Ge incident energy and reaction cross-sectional area.

FIG. 1 is the function graph for 69Ga (p, 2n) 68Ge target thickness and incident energy decay. The figure contains 5 groups of decay curves X1, X2, X3, X4, X5, generated by 5 different incident energy doses (30, 26, 25, 24, 23 MeV respectively) onto target thickness ranging 0~2.5 mm; FIG. 2 is the function graph for 69Ga(p, 2n) 68Ge incident energy and reaction cross-sectional area, comprising a curve C (Ge) for germanium (Ge)-68 incident energy and reaction cross-sectional area, a corrected and smoother function curve F (Ge), a curve C (Ga) for gallium (Ga)-68 incident energy and reaction cross-sectional area, a corrected and smoother function curve F(Ga), a curve C(Zn) for zinc (Zn)-65 incident energy and reaction cross-sectional area and a corrected and smoother function curve F(Zn).

Through the applications from the above FIG. 1 and FIG. 2, the present invention mainly consists of the following steps:

a. Calculate the thickness d for the electroplated gallium (Ga)-69 on the solid target;

b. On a graph of incident energy decay curves comprising a plural number of different irradiation energy doses Xi and 69Ga(p, 2n) 68Ge target thickness, select a decay curve with a default irradiation energy dose Xi, and based on the electroplating thickness d derive the relative irradiation energy dose Yi after decay;

c. On a graph of corrected function curves for 69Ga(p, 2n) 68Ge incident energy dose and reaction cross-sectional energy with different germanium (Ge)-68, gallium (Ga)-68, zinc (Zn)-65 irradiation doses and cross-sectional area, based on the defined position by irradiation energy dose Xi and the relative irradiation energy dose Yi, derive the two nuclear reaction cross-sectional areas corresponding to germanium (Ge)-68 and figure out the mean reaction area (MRA); by the same means, derive the two nuclear reaction cross-sectional areas corresponding to gallium (Ga)-68 and the two nuclear reaction cross-sectional areas corresponding to zinc (Zn)-65 and calculate the mean reaction area for each;

d. Repeat the above step b and step c and complete in sequence other different irradiation energy doses Xi, and derive a plural number of groups of MRAs corresponding to germanium (Ge)-68, gallium (Ga)-68 及 zinc (Zn)-65;

e. Select the maximum MRA corresponding to germanium (Ge)-68 and the minimum MRA corresponding to gallium (Ga)-68 and zinc (Zn)-65, and generate the required default radiation dose for each MRA in the group, which is the optimal reaction energy.

Figure 3:
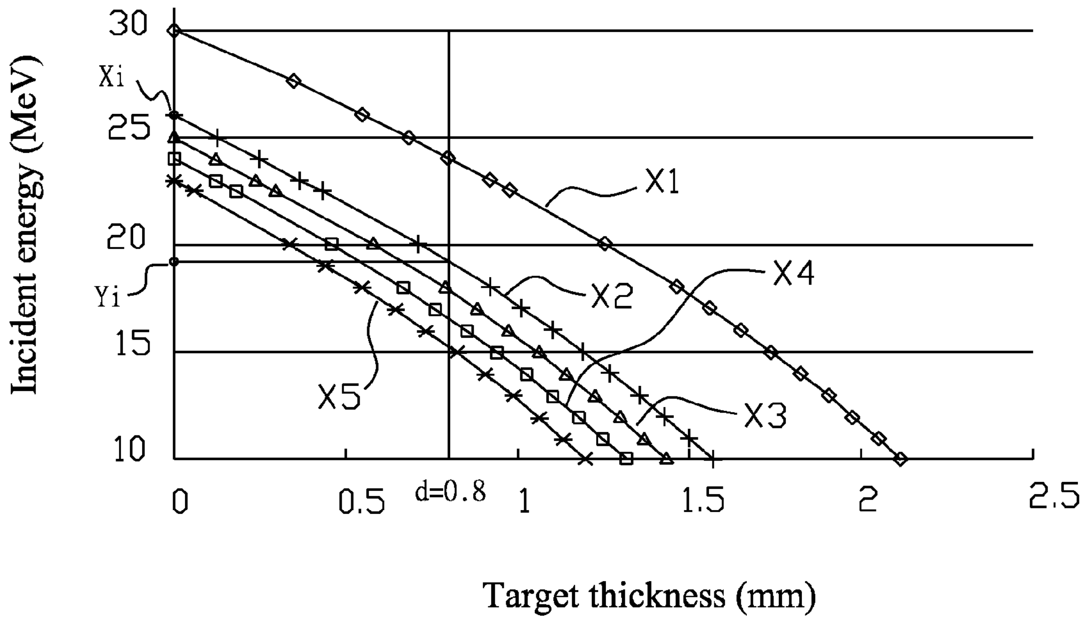
FIG. 3 is the illustration of acquiring target thickness and relative incident energy value according to FIG. 1.
Figure 4:
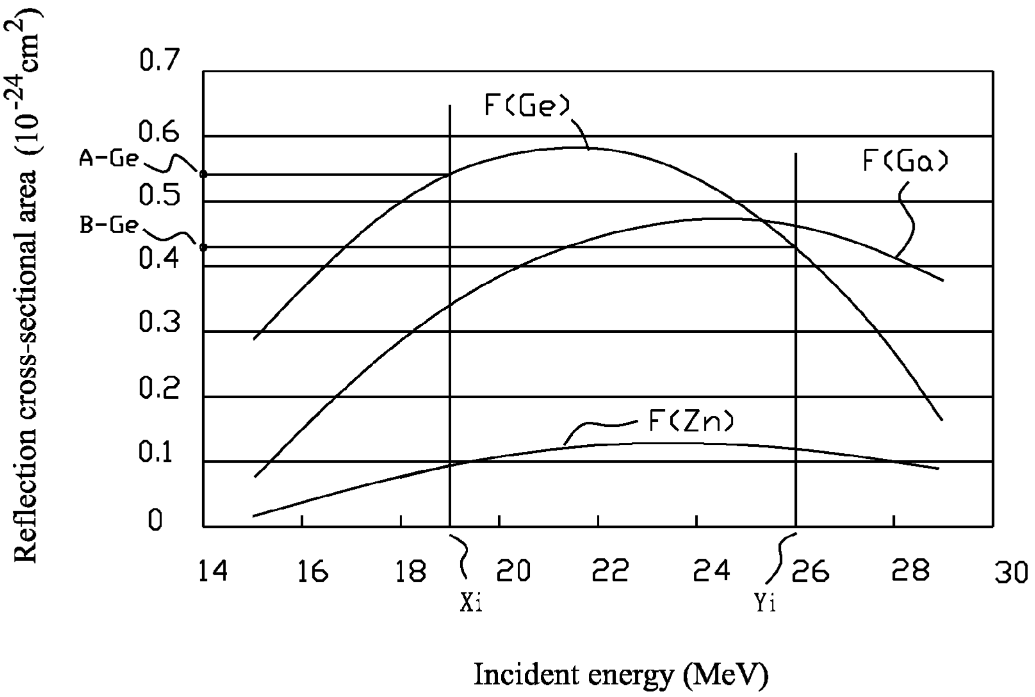
FIG. 4 is the illustration of acquiring Ge-65 MRA according to FIG. 2.

Please refer to figures from FIG. 3 to FIG. 6. In the following, an embodiment (default irradiation energy dose Xi=26 MeV as example) is used to explain the above steps:

a. Calculate the thickness d for the electroplated gallium (Ga)-69 on the solid target, the thickness d=0.8 mm.

b. Refer to FIG. 3. Draw a perpendicular line to where the electroplating thickness d=0.8 mm, and the line will intersect with the target thickness and incident energy decay curve X2 of 26 MeV, and draw a horizontal line from the intersection point to a relative irradiation energy dose Yi on Y axis, and record the point Yi=19 MeV; then calculate irradiation energy absorbance range (ΔEi): Zi (MeV)=26(MeV)−19(MeV)=7 MeV.

c. Refer to FIG. 4. Draw a perpendicular line at Xi (=26 MeV) and Yi (=19 MeV) respectively on X-axis. The two perpendicular lines intersect with the corrected function curve F (Ge) for germanium (Ge)-68 incident energy and reaction cross-sectional area, at the points corresponding to Y axis at a first germanium (Ge)-68 reaction cross-sectional area value, A-Ge, and at a second germanium (Ge)-68 reaction cross-sectional area value, B-Ge, respectively. Record the reaction cross-sectional areas at the two points as A-Ge=0.54 and B-Ge=0.43 respectively.

Figure 5:
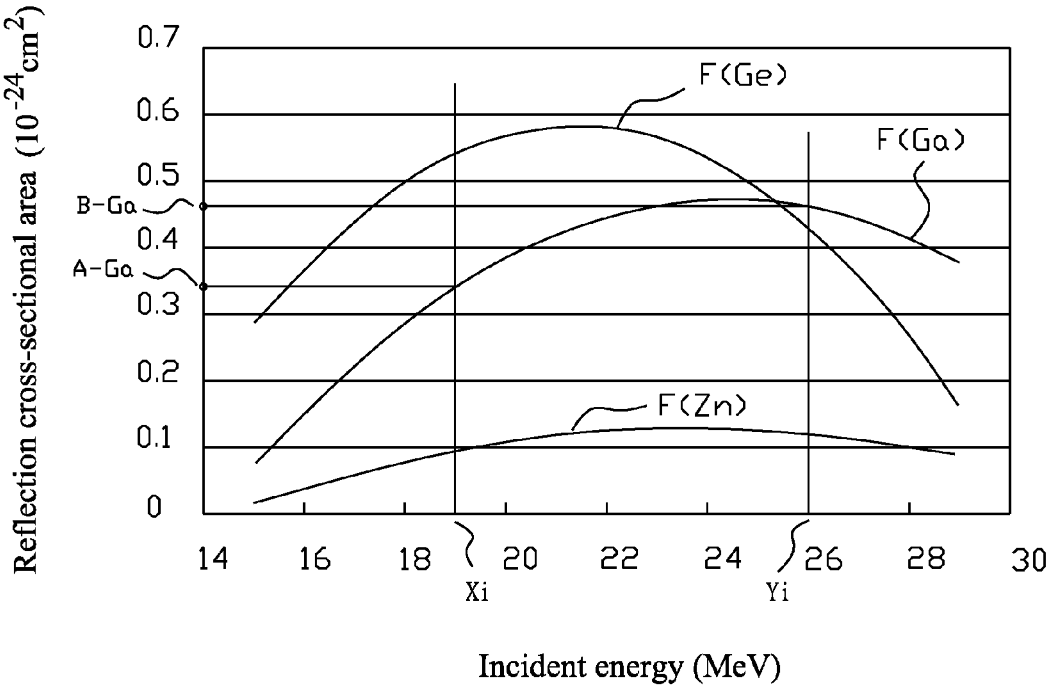
FIG. 5 is the illustration of acquiring Ga-68 MRA according to FIG. 2.

Refer to FIG. 5. The two perpendicular lines intersect the corrected function curve F (Ga) for gallium (Ga)-68 incident energy and reaction cross-sectional area, at the points corresponding to Y axis at a first gallium (Ga)-68 reaction cross-sectional area value, A-Ga, and a second gallium (Ga)-68 reaction cross-sectional area value, B-Ga. Record the reaction cross-sectional areas at the two points as A-Ga=0.34 and B-Ga=0.46 respectively.

Figure 6:
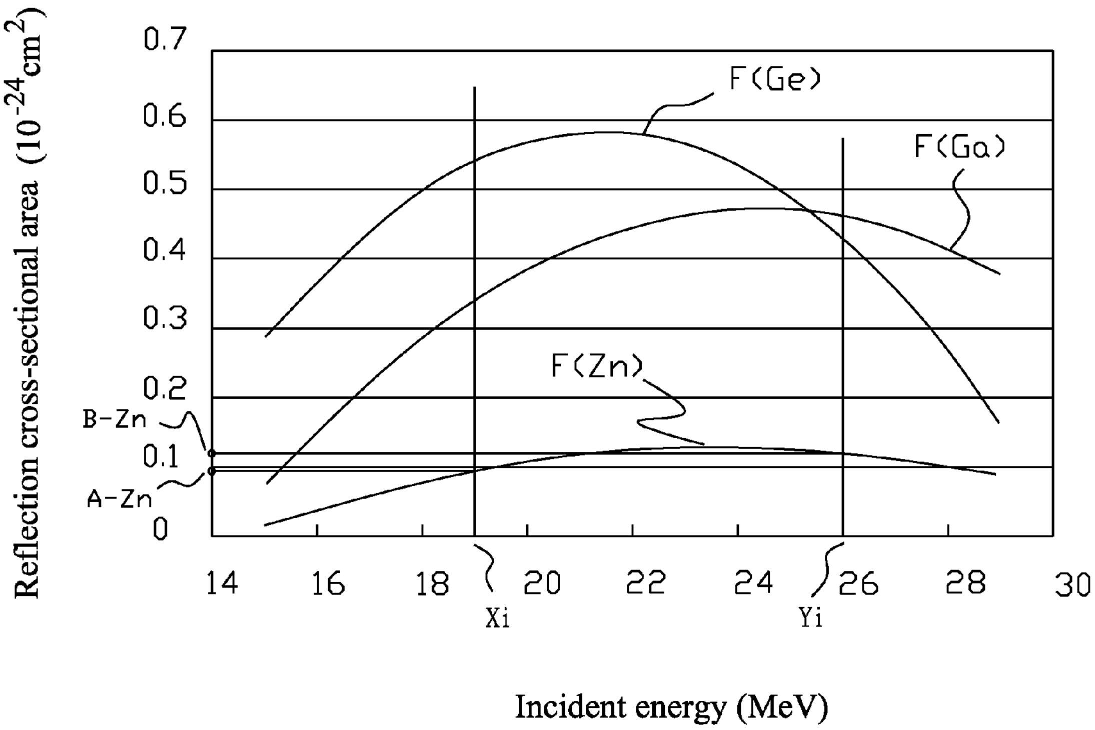
FIG. 6 is the illustration of acquiring Zn-65 MRA according to FIG. 2.

Refer to FIG. 6. The two perpendicular lines intersect the corrected function curve F (Zn) for zinc (Zn)-65 incident energy and reaction cross-sectional area, at the points corresponding to a first zinc (Zn)-65 reaction cross-sectional area value, A-Zn, and a second zinc (Zn)-65 reaction cross-sectional area value, B-Zn. Record the reaction cross-sectional areas at the two points as A-Zn=0.095 and B-Zn=0.12 respectively.

Then calculate each MRA (mean reaction areas) in the group as follows:

Ge-68 MRA=0.485.

Ga-68 MRA=0.4.

Zn-65 MRA=0.1075.

d. Repeat the above step b to step e to derive each MRA in each group with different default irradiation energy doses Xi (such as 30, 25, 24, 23 MeV etc.).

e. Compare MRA value in each group and find the maximum germanium (Ge)-68 MRA and the minimum gallium (Ga)-68 and zinc (Zn)-65 MRA at default irradiation energy dose Xi=26 MeV; therefore, 26 MeV is the optimal reaction energy.

The irradiation energy parameters derived from the above assessment are used in cyclotron irradiation to generate the best yield and the minimal other nuclides. The actual irradiation parameters are as follows:

1. Irradiation energy: 26 MeV
2. Accelerated particle: proton
3. Beam current: 200 μA
4. Irradiation time: 60 hr Note: 2~5 is fixed irradiation condition for 30 MeV cyclotron.

From the above it can be known that the assessment method for the solid target for the gallium (Ga)-68/germanium (Ge)-68 in the present invention proves to be predictive and controllable. Moreover, the irradiation products have consistent quality. Therefore, the present invention has proved to possess industrial usefulness, novelty and progressiveness.

However, the above mentioned is only one preferred embodiment for the present invention and not to limit the scope of the present invention. Those equivalent changes and modifications within the scope of the present invention shall all be covered by the claims of the application.

What is claimed is:

1. A method used to yield irradiation products with minimal impurities for solid targets for gallium (Ga)-68/germanium (Ge)-68 generators comprising steps:

a. Calculating a thickness d for a electroplated gallium (Ga)-69 on the solid target;

b. On a graph of incident energy decay curves comprising a plural number of different irradiation energy doses Xi and 69Ga(p, 2n) 68Ge target thickness, selecting a decay curve with a default irradiation energy dose Xi, and based on the electroplating thickness d deriving a relative irradiation energy dose Yi after decay;

c. On a graph of corrected function curves for 69Ga(p, 2n) 68Ge incident energy dose and reaction cross-sectional energy with different germanium (Ge)-68, gallium (Ga)-68, zinc (Zn)-65 irradiation doses and cross-sectional area, based on a defined position by irradiation energy dose Xi and the relative irradiation energy dose Yi, deriving two nuclear reaction cross-sectional areas corresponding to germanium (Ge)-68 and obtaining a mean reaction area (MRA); by the same means, deriving the two nuclear reaction cross-sectional areas corresponding to gallium (Ga)-68 and two nuclear reaction cross-sectional areas corresponding to zinc (Zn)-65 and calculate the mean reaction area for each;

d. Repeating the above step b and step c and completing in sequence other different irradiation energy doses Xi, and deriving a plural number of groups of MRAs corresponding to germanium (Ge)-68, gallium (Ga)-68 and zinc (Zn)-65;

e. Selecting a maximum MRA corresponding to germanium (Ge)-68 and a minimum MRA corresponding to gallium (Ga)-68 and zinc (Zn)-65, and generating a required default radiation dose for each reaction cross-sectional area in the group, which is an optimal reaction energy.

2. According to the method used to yield irradiation products with minimal impurities for the solid target for gallium (Ga)-68/germanium (Ge)-68 generators in claim 1, the decay curve graph comprising 69Ga(p, 2n) 68Ge target thickness and incident energy has at least 5 irradiation energy doses Xi.

3. According to the method used to yield irradiation products with minimal impurities for the solid target for gallium (Ga)-68/germanium (Ge)-68 generators in claim 2, the five irradiation energy doses Xi are 30 MeV, 26 MeV, 25 MeV, 24 MeV and 23 MeV respectively.

4. According to the method used to yield irradiation products with minimal impurities for the solid target for gallium (Ga)-68/germanium (Ge)-68 generator in claim 3, at irradiation energy dose Xi, it can derive a first germanium (Ge)-68 reaction cross-sectional area value from the corrected function curve of germanium (Ge)-68 incident energy and reaction cross-sectional area; and at corresponding irradiation energy dose Yi, it can derive a second germanium (Ge)-68 reaction cross-sectional area value from the corrected function graph of germanium(Ge)-68 incident energy and reaction cross-sectional area; and the germanium(Ge)-68MRA value is the average value of the first and the second germanium(Ge)-68 reaction cross-sectional area values.

5. According to the method used to yield irradiation products with minimal impurities for the solid target for gallium (Ga)-68/germanium (Ge)-68 generator in claim 4, at irradiation energy dose Xi, it can derive a first gallium (Ga)-68 reaction cross-sectional area from the corrected function graph of gallium (Ga)-68 incident energy and reaction cross-sectional area; and at corresponding irradiation energy dose Yi, it can derive a second gallium (Ga)-68 reaction cross-sectional area value from the corrected function graph of gallium (Ga)-68 incident energy and reaction cross-sectional area; and the gallium (Ga)-68 MRA is the average value of the first and the second germanium(Ge)-68 reaction cross-sectional area values.

6. According to the method used to yield irradiation products with minimal impurities for the solid target for gallium (Ga)-68/germanium (Ge)-68 generator in claim 4, at irradiation energy dose Xi, it can derive a first zinc (Zn)-65 reaction cross-sectional area value from the corrected function graph of zinc (Zn)-65 incident energy and reaction cross-sectional area, and at corresponding irradiation energy dose Yi, it can derive a second zinc (Zn)-65 reaction cross-sectional area value from the corrected function graph of zinc (Zn)-65 incident energy and reaction cross-sectional area; and the zinc (Zn)-65 MRA is the average value of the first and the second zinc (Zn)-65 reaction cross-sectional area values.

7. According to the method used to yield irradiation products with minimal impurities for the solid target for gallium (Ga)-68/germanium (Ge)-68 generator in claim 3, at irradiation energy dose Xi, it can derive a first gallium (Ga)-68 reaction cross-sectional area value from the corrected function graph of gallium (Ga)-68 incident energy and reaction cross-sectional area; and at corresponding irradiation energy dose Yi, it can derive a second gallium (Ga)-68 reaction cross-sectional area value from the corrected function graph of gallium (Ga)-68 incident energy and reaction cross-sectional area; and the gallium (Ga)-68 MRA is the average value of the first and the second germanium(Ge)-68 reaction cross-sectional area values.

8. According to the method used to yield irradiation products with minimal impurities for the solid target for gallium (Ga)-68/germanium (Ge)-68 generator in claim 3, at irradiation energy dose Xi, it can derive a first zinc (Zn)-65 reaction cross-sectional area value from the corrected function graph of zinc (Zn)-65 incident energy and reaction cross-sectional area, and at corresponding irradiation energy dose Yi, it can derive a second zinc (Zn)-65 reaction cross-sectional area value from the corrected function graph of zinc (Zn)-65 incident energy and reaction cross-sectional area; and the zinc (Zn)-65 MRA is the average value of the first and the second zinc (Zn)-65 reaction cross-sectional area values.

* * * * *